(12) United States Patent
Avanzi

(10) Patent No.: US 12,124,711 B2
(45) Date of Patent: Oct. 22, 2024

(54) PROTECTION OF MEMORY USING MULTIPLE ADDRESS TRANSLATION FUNCTIONS

(71) Applicant: Arm Limited, Cambridge (GB)

(72) Inventor: Roberto Avanzi, Munich (DE)

(73) Assignee: Arm Limited, Cambridge (GB)

(*) Notice: Subject to any disclaimer, the term of this patent is extended or adjusted under 35 U.S.C. 154(b) by 52 days.

(21) Appl. No.: 17/944,553

(22) Filed: Sep. 14, 2022

(65) Prior Publication Data
US 2024/0086085 A1 Mar. 14, 2024

(51) Int. Cl.
*G06F 3/06* (2006.01)

(52) U.S. Cl.
CPC .......... *G06F 3/0623* (2013.01); *G06F 3/0659* (2013.01); *G06F 3/0673* (2013.01)

(58) Field of Classification Search
CPC ..... G06F 3/0623; G06F 3/0659; G06F 3/0673
See application file for complete search history.

(56) References Cited

U.S. PATENT DOCUMENTS

2022/0019357 A1* 1/2022 Cho ............... G06F 3/0679

* cited by examiner

*Primary Examiner* — Gary W. Cygiel
(74) *Attorney, Agent, or Firm* — NIXON & VANDERHYE P.C.

(57) ABSTRACT

Apparatus, methods, and software for protecting a plurality of memory locations are disclosed. Logical addresses are translated into physical addresses in dependence on one of a first translation function and a second translation function. A transitional logical address and an associated transitional value are locally held in circuitry which applies the translation functions. A remapping of first to second translation function usage is performed by determining a new transitional physical address by applying the second translation function to the transitional logical address; determining a new transitional logical address by applying an inverse of the first translation function to the new transitional physical address; retrieving a new transitional value using the new transitional physical address; storing the old transitional value to the memory location indicated by the new transitional physical address; and locally storing the new transitional value. This remapping can be interleaved with normal memory accesses.

20 Claims, 7 Drawing Sheets

PROTECTION OF MEMORY USING MULTIPLE ADDRESS TRANSLATION FUNCTIONS

TECHNICAL FIELD

The present disclosure relates to data processing. In particular, the present disclosure relates to the protection of memory using multiple address translation functions.

DESCRIPTION

A data processing apparatus may be required to protect the data which it stores in a memory. One approach is for the data to be stored in an encrypted form. Another approach is for the physical addresses used to store the data to be scrambled, so that for example data that is logically stored at adjacent addresses is randomly scattered across the physical memory space. Nevertheless, even scrambling the physical addresses in this manner may be susceptible to information leakage, because over extended periods of the observation data reuse can be detected.

SUMMARY

In one example described herein there an apparatus for protecting a plurality of memory locations comprising:
  address translation circuitry configured to translate between logical addresses and physical addresses in dependence on one of a first translation function and a second translation function;
  remapping array storage configured to hold a remapping array comprising a plurality of entries corresponding to the plurality of memory locations, wherein each entry of the plurality of entries is indicative of whether a corresponding logical address is to be translated using the first translation function or the second translation function;
  memory access circuitry to control access to the plurality of memory locations by causing the address translation circuitry to translate an accessed logical address into an accessed physical address using the first translation function or the second translation function in dependence on content of the remapping array for the accessed logical address;
  transitional logical address storage configured to hold a transitional logical address;
  transitional value storage configured to hold a transitional value associated with the transitional logical address; and
  remapping circuitry configured to remap the transitional logical address from first translation function usage to second translation function usage by:
    determining a new transitional physical address by causing the address translation circuitry to apply the second translation function to the transitional logical address;
    determining a new transitional logical address by causing the address translation circuitry to apply an inverse of the first translation function to the new transitional physical address;
    retrieving a temporary transitional value from a memory location indicated by the new transitional physical address;
    storing the transitional value held in the transitional value storage to the memory location indicated by the new transitional physical address; and
    storing the temporary transitional value to the transitional value storage.

In one example described herein there a method of protecting a plurality of memory locations comprising:
  translating between logical addresses and physical addresses in dependence on one of a first translation function and a second translation function;
  maintaining a remapping array comprising a plurality of entries corresponding to the plurality of memory locations, wherein each entry of the plurality of entries is indicative of whether a corresponding logical address is to be translated using the first translation function or the second translation function;
  controlling access to the plurality of memory locations by translating an accessed logical address into an accessed physical address using the first translation function or the second translation function in dependence on content of the remapping array for the accessed logical address;
  holding a transitional logical address in transitional logical address storage;
  holding a transitional value associated with the transitional logical address in transitional value storage; and
  remapping the transitional logical address from first translation function usage to second translation function usage by:
    determining a new transitional physical address by applying the second translation function to the transitional logical address;
    determining a new transitional logical address by applying an inverse of the first translation function to the new transitional physical address;
    retrieving a temporary transitional value from a memory location indicated by the new transitional physical address;
    storing the transitional value held in the transitional value storage to the memory location indicated by the new transitional physical address; and
    storing the temporary transitional value to the transitional value storage.

In one example described herein there a computer readable-storage medium storing in a non-transient fashion instructions, which when executed by a computing device cause the computing device to perform the above example method.

In one example described herein there an apparatus for protecting a plurality of memory locations comprising:
  means for translating between logical addresses and physical addresses in dependence on one of a first translation function and a second translation function;
  means for maintaining a remapping array comprising a plurality of entries corresponding to the plurality of memory locations, wherein each entry of the plurality of entries is indicative of whether a corresponding logical address is to be translated using the first translation function or the second translation function;
  means for controlling access to the plurality of memory locations by causing the means for translating to translate an accessed logical address into an accessed physical address using the first translation function or the second translation function in dependence on content of the remapping array for the accessed logical address;
  means for holding a transitional logical address;
  means for holding a transitional value associated with the transitional logical address; and means for remapping the transitional logical address from first translation function usage to second translation function usage comprising:
  means for determining a new transitional physical address by applying the second translation function to the transitional logical address;
  means for determining a new transitional logical address by applying an inverse of the first translation function to the new transitional physical address;
  means for retrieving a temporary transitional value from a memory location indicated by the new transitional physical address;
  means for storing the transitional value held in the means for holding a transitional value to the memory location indicated by the new transitional physical address; and
  means for storing the temporary transitional value to the means for holding a transitional value.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
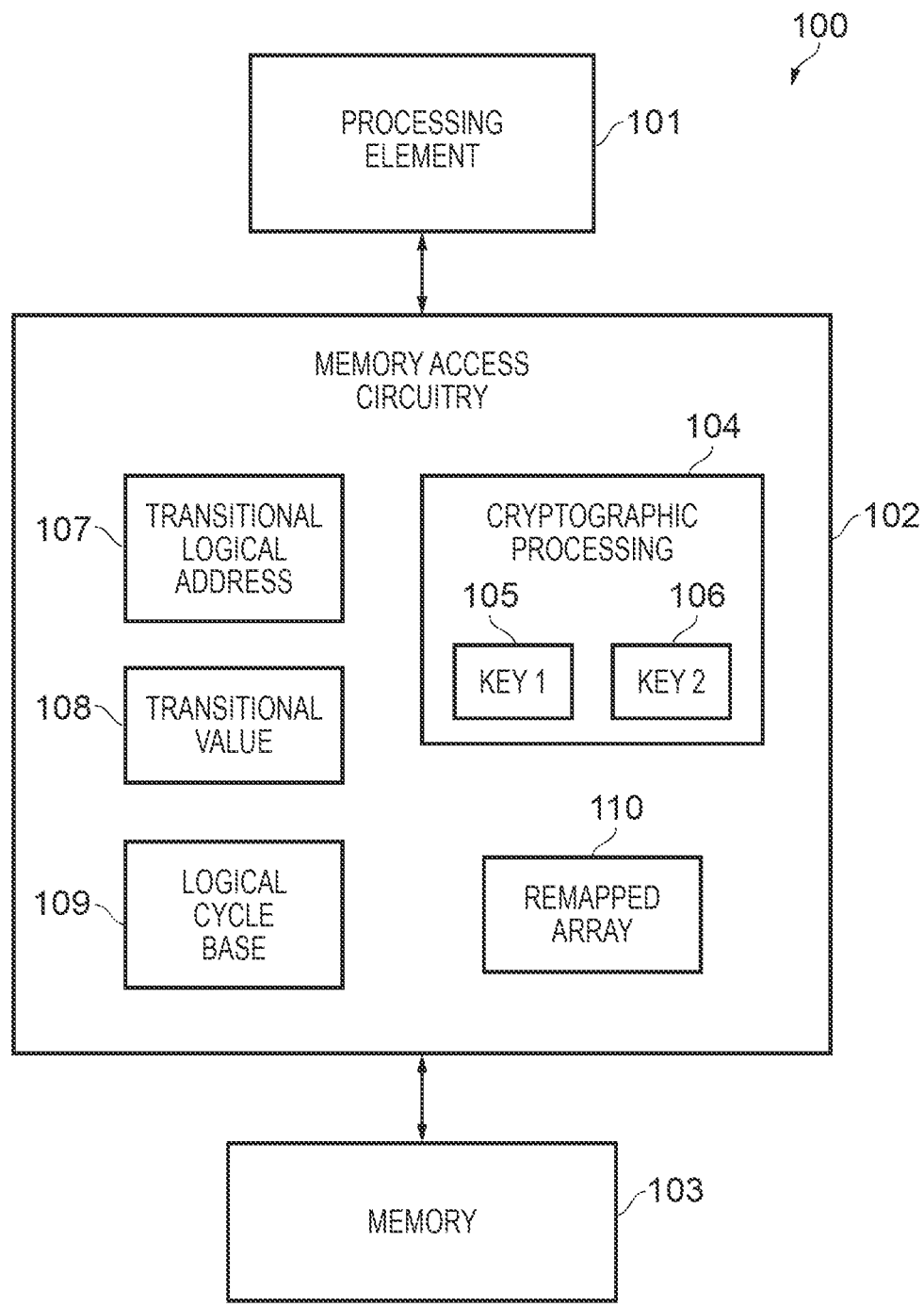
FIG. 1 schematically illustrates a data processing apparatus in accordance with some examples.

Before discussing the embodiments with reference to the accompanying figures, the following description of embodiments is provided.

In accordance with one example configuration there is provided an apparatus for protecting a plurality of memory locations comprising:
  address translation circuitry configured to translate between logical addresses and physical addresses in dependence on one of a first translation function and a second translation function;
  remapping array storage configured to hold a remapping array comprising a plurality of entries corresponding to the plurality of memory locations, wherein each entry of the plurality of entries is indicative of whether a corresponding logical address is to be translated using the first translation function or the second translation function;
  memory access circuitry to control access to the plurality of memory locations by causing the address translation circuitry to translate an accessed logical address into an accessed physical address using the first translation function or the second translation function in dependence on content of the remapping array for the accessed logical address;
  logical transitional logical address storage configured to hold a transitional logical transitional address;
  transitional value storage configured to hold a transitional value associated with the transitional logical transitional address; and
  remapping circuitry configured to remap the transitional logical address from first translation function usage to second translation function usage by:
    determining a new transitional physical address by causing the address translation circuitry to apply the second translation function to the transitional logical address;
    determining a new transitional logical address by causing the address translation circuitry to apply an inverse of the first translation function to the new transitional physical address;
    retrieving a temporary transitional value from a memory location indicated by the new transitional physical address;
    storing the transitional value held in the transitional value storage to the memory location indicated by the new transitional physical address; and
    storing the temporary transitional value to the transitional value storage.

The present techniques are based on the recognition that the translation of logical addresses used by a data processor to reference memory locations into physical addresses of the actual memory locations via a translation function brings a useful degree of protection to the handling of the data stored in those memory locations, but that this protection is further advanced if the system can transition from using a first translation function to using a second translation function. Nevertheless, it is further desirable if the transition from using the first translation function to using the second translation function can be achieved without notable disruption to the usual memory accesses that are carried out to support data processing operations. It is recognised that attempting to transition all protected memory locations from access via the first translation function to access using the second translation function as a block would significantly interrupt normal data processing operations seeking to access the memory. The present techniques address this issue by maintaining a pair of transitional data in the memory access circuitry comprising a selected one of the logical addresses (the "transitional logical address") and a corresponding data value (the "transitional value") retrieved from the memory, this being the data value which a data processor expects to receive when it accesses that transitional logical address. Furthermore, the memory access circuitry then performs a remapping process to carry out a step of the transition from using the first translation function to using the second translation function, whereby the second translation function is applied to the locally held "transitional logical address" to determine a new physical memory location. The data value at that new physical memory location is retrieved and replaced by the locally held "transitional value". The newly retrieved data value from the new physical memory location becomes the locally held "transitional value". A new "transitional" logical address is identified by applying the inverse of the first translation function to the new physical memory location and replaces the locally held "transitional logical address". Accordingly, the remapping from first translation function usage to second translation function usage is performed in single address steps, which is minimally disruptive to the normal memory accesses which must be supported.

Where the remapping from first translation function usage to second translation function usage is performed in single address steps, this means that the remapping can essentially be performed in parallel with usual memory access operations without significant interruption to those usual memory accesses and accordingly in some examples the remapping circuitry is configured to perform the remapping of the transitional logical address in an interleaved manner with respect to the access to the plurality of memory locations controlled by the memory access circuitry. This allows both the remapping and the normal memory accesses to proceed without one displacing the other.

Equally, the remapping from first translation function usage to second translation function usage may be deemed to be required to be a strictly background process which does not delay normal memory accesses at all and thus is some examples the remapping circuitry is configured to perform the remapping of the transitional logical address in interim period when the memory access circuitry is not controlling access to the plurality of memory locations.

In some examples the remapping circuitry is configured to perform the remapping of the transitional logical address comprising causing the content of the remapping array to be modified to indicate that the transitional logical address is to be translated using the second translation function. Accordingly, the array is maintained to track which logical addresses have been remapped from using the first translation function to using the second translation function.

Given that the sequence of locally held "transitional values" depends on the first and second translation functions, a series of remapping steps as described to transition given logical addresses from first translation function usage to second translation function usage will sooner or later lead to logical address which has already been remapped. This event can be identified with reference to the content of the remapping array. Accordingly, in some examples the remapping circuitry is configured to perform the remapping of the transitional logical address in a remapping cycle beginning at a cycle base logical address and iteratively remapping a sequence of transitional logical addresses until the new transitional logical address determined is found to be indicated by content of the remapping array to be translated using the second translation function.

When a remapping cycle is found to have closed in this manner, if there are still further logical addresses to be remapped using from the first translation function to using the second translation function, then a new cycle can be started. Accordingly, in some examples the remapping circuitry is responsive to conclusion of the remapping cycle to determine a new cycle base logical address which is found to be indicated by content of the remapping array to be translated using the first translation function and to start a new remapping cycle beginning at the new cycle base logical address.

When all logical addresses have been remapped, this means that all logical addresses now use the second translation function. At this point, assuming that there is the desire not to simply remain using the second translation function indefinitely, one option would be to then rerun the process to iteratively convert all logical addresses back to using the first translation function. However greater security is achieved by changing the functions and accordingly in some examples the remapping circuitry is responsive to a determination that all logical addresses corresponding to the plurality of memory locations are indicated by content of the remapping array to be translated using the second translation function to:
  redefine the second translation function as a new first translation function;
  define a new second translation function; and
  reset the cycle base logical address.

Thus, whilst the new second translation function could be defined to be the old first translation function (thus iteratively switching all translations back to first translation function usage in due course), improved security is achieved by defining a new second translation function, different to both the old first and old second translation functions.

The first and second translation function may take a variety of forms and may be generated in a variety of ways, but in some examples the address translation circuitry is configured to apply the first translation function and the second translation function by applying respective first and second private encryption keys to a predefined scrambling function.

In some examples the address translation circuitry is configured to periodically update the first and second private encryption keys. For example, these keys could be updated when a full set of remapping of the logical addresses has completed.

In accordance with one example configuration there is provided a method of protecting a plurality of memory locations comprising:
  translating between logical addresses and physical addresses in dependence on one of a first translation function and a second translation function;
  maintaining a remapping array comprising a plurality of entries corresponding to the plurality of memory locations, wherein each entry of the plurality of entries is indicative of whether a corresponding logical address is to be translated using the first translation function or the second translation function;
  controlling access to the plurality of memory locations by translating an accessed logical address into an accessed physical address using the first translation function or the second translation function in dependence on content of the remapping array for the accessed logical address;
  holding a logical transitional logical address in logical transitional logical address storage;
  holding a transitional value associated with the logical transitional logical address in transitional value storage; and
  remapping the transitional logical address from first translation function usage to second translation function usage by:
    determining a new transitional physical address by applying the second translation function to the transitional logical address;
    determining a new transitional logical address by applying an inverse of the first translation function to the new transitional physical address;
    retrieving a temporary transitional value from a memory location indicated by the new transitional physical address;
    storing the transitional value held in the transitional value storage to the memory location indicated by the new transitional physical address; and
    storing the temporary transitional value to the transitional value storage.

In accordance with one example configuration there is provided a computer readable-storage medium storing in a non-transient fashion instructions, which when executed by a computing device cause the computing device to perform the method of any of example configuration disclosed herein.

In accordance with one example configuration there is provided an apparatus for protecting a plurality of memory locations comprising:
  means for translating between logical addresses and physical addresses in dependence on one of a first translation function and a second translation function;
  means for maintaining a remapping array comprising a plurality of entries corresponding to the plurality of memory locations, wherein each entry of the plurality of entries is indicative of whether a corresponding logical address is to be translated using the first translation function or the second translation function;
  means for controlling access to the plurality of memory locations by causing the means for translating to translate an accessed logical address into an accessed physical address using the first translation function or the second translation function in dependence on content of the remapping array for the accessed logical address;
  means for holding a logical transitional logical address;
  means for holding a transitional value associated with the logical transitional logical address; and
  means for remapping the transitional logical address from first translation function usage to second translation function usage comprising:
    means for determining a new transitional physical address by applying the second translation function to the transitional logical address;
    means for determining a new transitional logical address by applying an inverse of the first translation function to the new transitional physical address;
    means for retrieving a temporary transitional value from a memory location indicated by the new transitional physical address;
    means for storing the transitional value held in the means for holding a transitional value to the memory location indicated by the new transitional physical address; and
    means for storing the temporary transitional value to the means for holding a transitional value.

Particular embodiments will now be described with reference to the figures.

FIG. 1 illustrates a data processing apparatus 100 in accordance with one embodiment. The apparatus comprises a processing element 101, memory access circuitry 102, and a memory 103. The processing element 101 is configured to perform data processing operations with respect to data values which are stored in the memory 103. For this purpose the memory access circuitry 102 is provided, whereby the processing element 101 passes memory access requests to the memory access circuitry 102, where the memory access requests reference memory storage locations in terms of logical addresses. These logical addresses are to be contrasted with the actual physical addresses of the memory locations at which the data is stored. In order to protect the data which the processing element retrieves from the memory 103 and write back to the memory 103, the memory access circuitry 102 is arranged to apply an address translation function to a logical address provided by the processing element 101 to generate a translated physical address. The data values themselves which are stored in the memory 103 may also be protected by encryption, although that is not the focus of the current disclosure. Nevertheless, to be clear, known data encryption techniques may also be combined with the techniques disclosed herein. The memory access circuitry 102 does not however only apply a static address translation function to the logical addresses provided by the processing element 101, but is further configured (as will be described in more detail with reference to the figures which follow) to remap the set of memory locations which it protects from usage of a first address translation function to usage of a second address translation function. This remapping is performed iteratively, whereby a single logical address is transitioned from first address translation function usage to second address translation function usage. In some examples the remapping is interleaved with normal memory accesses handled by the memory access circuitry 102 when servicing memory access requests from the processing element 101. Nevertheless, in periods when the memory access circuitry is not currently servicing a memory access request from the processing element 101, multiple remapping steps may be performed. In implementations in which the servicing of memory access requests from the processing element 101 should be delayed as little as possible, the memory access circuitry 102 may be configured to only perform remapping when it would otherwise be idle.

The memory access circuitry 102 comprises cryptographic processing circuitry 104, which holds two key values, "key 1" 105 and "key 2" 106. These keys provide the basis for the two address translation functions which the cryptographic processing circuitry 104 supports. Provided with an input logical address, the cryptographic processing circuitry 104 applies one of the two address translation functions to that input logical address to generate a translated physical address. The cryptographic processing circuitry 104 can also apply the inverse of either function, i.e. provided with a given physical address will return the corresponding logical address. Further components of the memory access circuitry 102 shown in FIG. 1 are the transitional logical address storage 107, the transitional value storage 108, the logical cycle base storage 109, and the remapped array 110. The transitional logical address storage 107 is used by the memory access circuitry 102 to hold a selected logical address and forms part of the present techniques for remapping logical addresses from usage of the first address translation function to usage of the second address translation function. This is described in more detail with reference to the figures which follow. The transitional value storage 108 holds the value retrieved from memory which corresponds to the logical address stored in the transitional logical address storage 107. Remapping logical addresses from usage of the first address translation function to usage of the second address translation function is performed in "cycles", whereby a current logical address stored in the transitional logical address storage 107 indirectly determines what the next logical address stored in the transitional logical address storage 107 will be (and for which the remapping will be performed). Sooner or later, these concatenations of logical addresses will lead to logical address which has already been remapped. This is referred to herein as the completion of a remapping cycle. Which logical addresses have been remapped is tracked using the remapped array 110, which comprises entries for each of the logical addresses, in which a bit is stored indicative of whether or not that logical address has been remapped are not. When a remapping cycle is completed, a new logical cycle base value (stored in the logical cycle base storage 109) is selected in order to start a new remapping cycle. Thus eventually all logical addresses are remapped. At that point key values 105 and 106 may be updated in order to continue rolling process of scrambling the memory addresses and remapping them. In fact, this updating may comprise the second address translation function (according to which all logical addresses are now to be translated in order to determine the correct physical memory address) being relabeled as the first address translation function, and a new second address translation function being defined. The process of remapping logical address translation function usage from the first (i.e. the old second) function to the new second function can then proceed. It should be noted that although the transitional logical address storage 107, the transitional value storage 108, the logical cycle base storage 109, and the remapped array 110 are shown in FIG. 1 as forming part of the memory access circuitry 102, in other examples these could form part of the memory 103.

Figure 2:
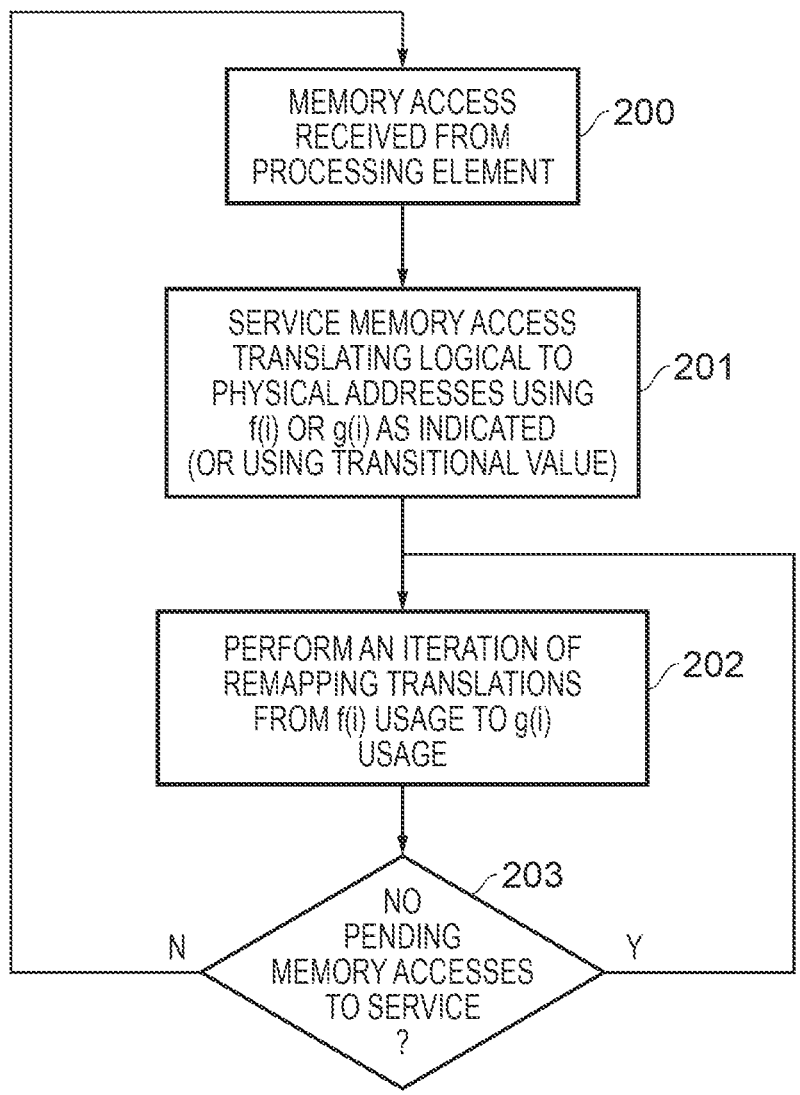
FIG. 2 is a flow diagram showing steps which are taken when interleaving remapping address translations between memory accesses in accordance with some examples.

FIG. 2 is a flow diagram showing steps which are taken during the operation of the data processing apparatus 100 in some examples. Here the data processing apparatus 100 is performing its normal data processing operations, which comprise accessing data stored in the memory 103. The memory access circuitry 102 is arranged to interleave remapping the translation function usage with the normal memory access functions which it supports (i.e. reading from and writing to the memory 103). The flow can be considered to begin at step 200 where a memory access request is received by the memory access circuitry 102 from the processing element 101. Then at step 201 the memory access request is serviced, wherein the logical address specified in the memory access request received is translated into a physical address using either a first address translation function (f(i)) or a second address translation function (g(i)) in dependence on whether that logical address is indicated (by the remapped array 110) as should be translated by one or the other. In fact, a further special case exists, when the logical address specified in the memory access request is the same as the transitional logical address currently stored in the transitional logical address storage 107. When this is the case, the memory access request is serviced using the transitional value stored in the transitional value storage 108. Otherwise, the translated physical memory address is used to access the memory in the usual manner. Interleaving of remapping then occurs at step 202, whereby the memory access circuitry 102 performs an iteration of remapping, transitioning a logical address from first address translation function (f(i)) usage to second address translation function (g(i)) usage. Then at step 203 it is determined if there are currently no pending memory accesses for the memory access circuitry 102 to service, if this is not the case then the flow returns to step 200 for the waiting memory access request to be serviced. However, if there is currently no pending memory access request, the flow returns to step 202 and the memory access circuitry 102 takes the opportunity to perform a further iteration of remapping a logical address translation from first address translation function (f(i)) usage to second address translation function (g(i)).

Figure 3:
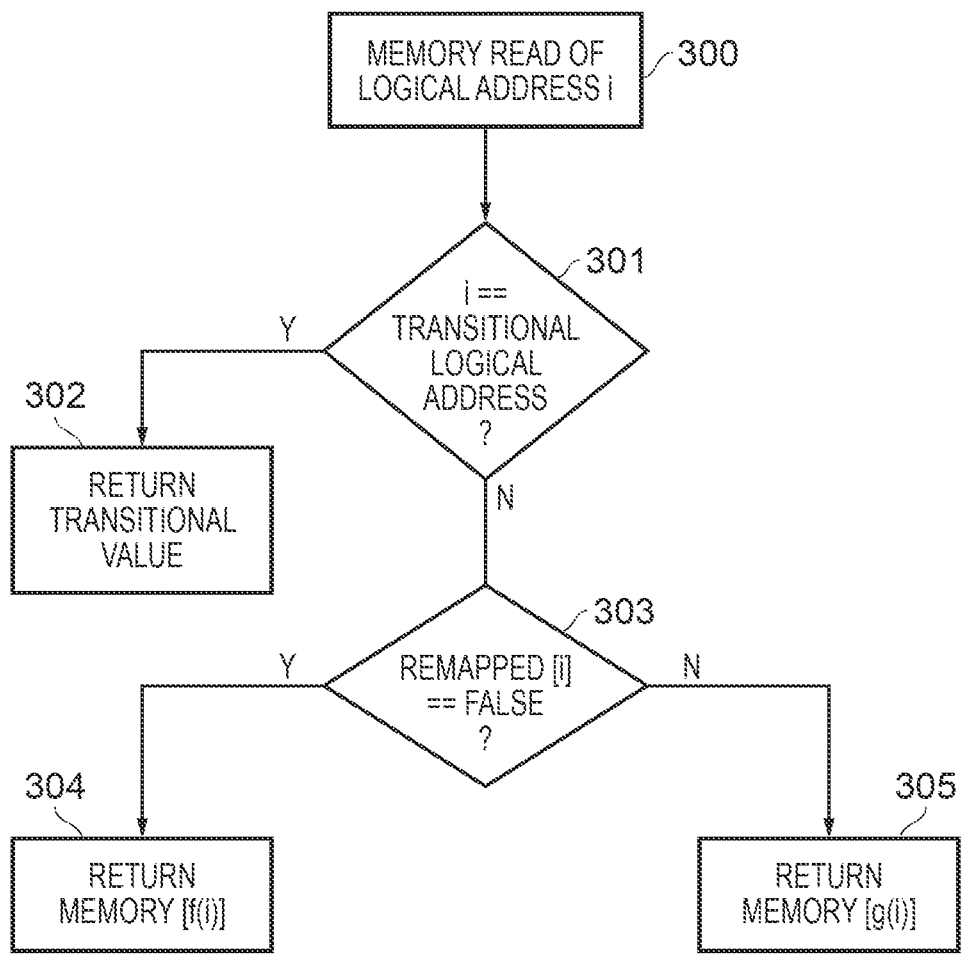
FIG. 3 is a flow diagram showing steps which are taken when performing a memory read in accordance with some examples.

FIG. 3 is a flow diagram showing steps which are taken to service a memory read request received from the processing element in some examples. The flow begins at step 300, with a memory read request specifying logical address i having been received. At step 301 it is determined if logical address i matches the current transitional logical address. When it does the flow proceeds to step 302 and the currently held transitional value is returned to service this read request. Otherwise the flow proceeds to step 303 where the remapped array is examined to determine if logical address i has not yet been remapped (REMAPPED[i]==FALSE). When this is the case the flow proceeds to step 304, where the logical address i is translated using the first address translation function f(i) and the resulting memory address provides the data value which is the subject of the memory read request. Otherwise, when this logical address i has already been remapped (REMAPPED[i]==TRUE), the flow proceeds to step 305, where the logical address i is translated using the second address translation function g(i) and the resulting memory address provides the data value which is the subject of the memory read request.

Figure 4:
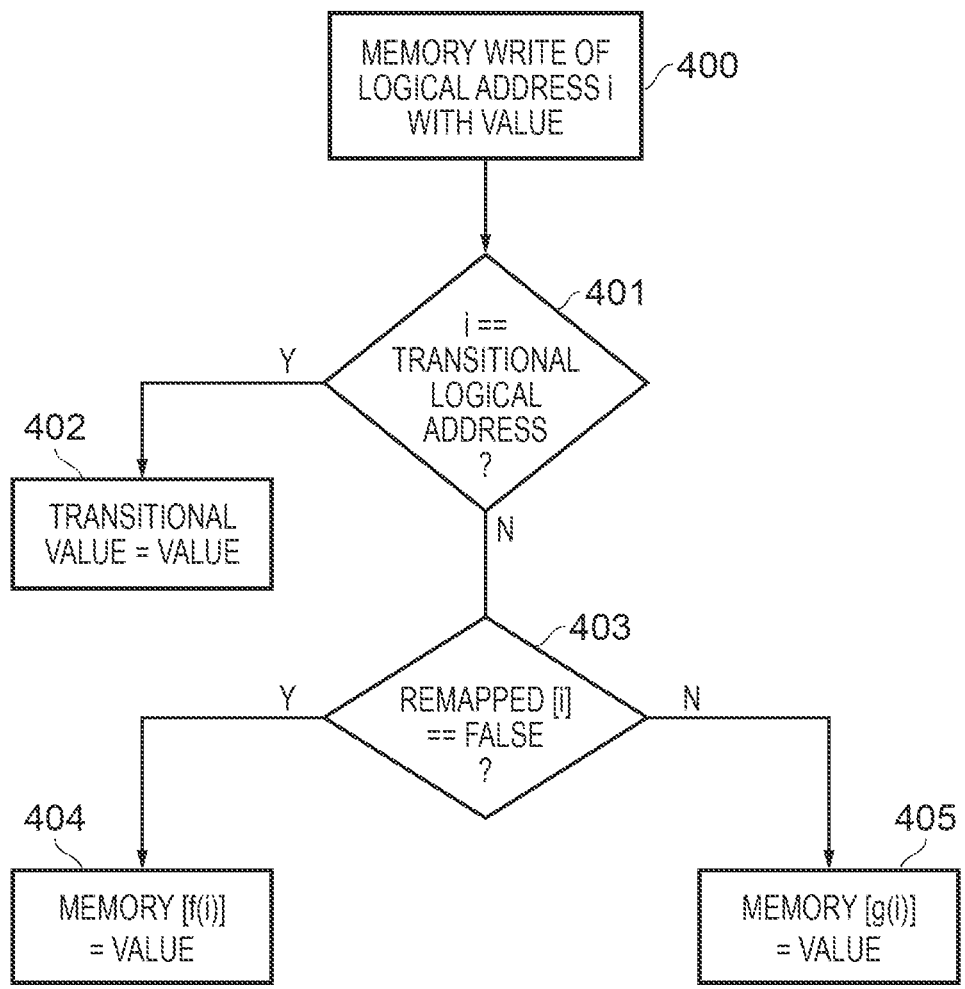
FIG. 4 is a flow diagram showing steps which are taken when performing a memory write in accordance with some examples.

FIG. 4 is a flow diagram showing steps which are taken to service a memory write request received from the processing element in some examples. The flow begins at step 400, with a memory write request specifying logical address i and data value VALUE having been received. At step 401 it is determined if logical address i matches the current transitional logical address. When it does the flow proceeds to step 402 and the data value VALUE replaces the currently held transitional value to service this write request. Otherwise the flow proceeds to step 403 where the remapped array is examined to determine if logical address i has not yet been remapped (REMAPPED[i]==FALSE). When this is the case the flow proceeds to step 404, where the logical address i is translated using the first address translation function f(i) and the data value VALUE is written to the resulting memory address. Otherwise, when this logical address i has already been remapped (REMAPPED[i]==TRUE), the flow proceeds to step 405, where the logical address i is translated using the second address translation function g(i) and data value VALUE is written to the resulting memory address.

Figure 5:
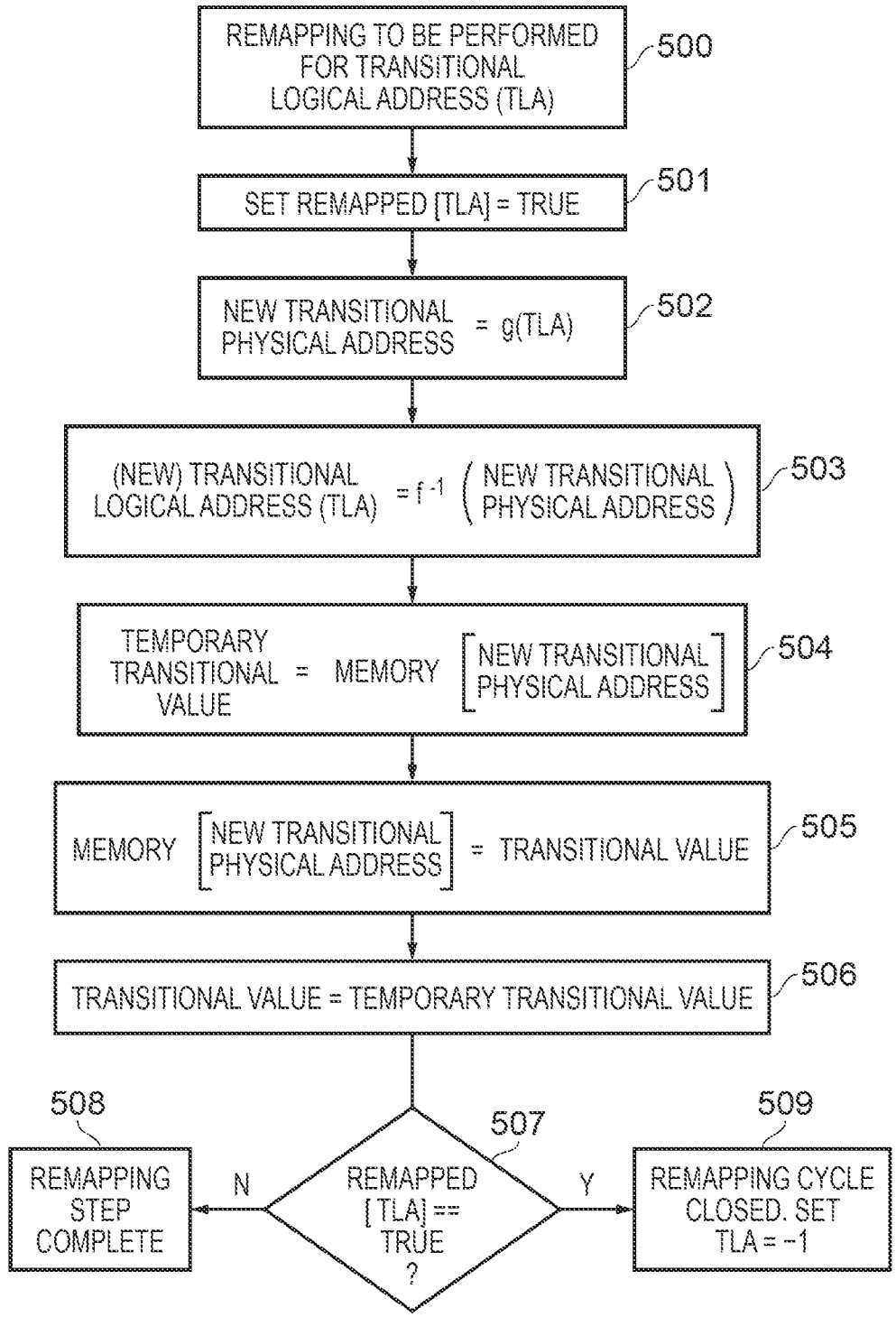
FIG. 5 is a flow diagram showing steps which are taken when remapping address translations in accordance with some examples.

FIG. 5 is a flow diagram showing steps which are taken when performing the address translation function remapping in accordance with some examples. The flow begins at step 500 where the remapping is to be performed for the transitional logical address (TLA). Next at step 501 the corresponding entry in the remapped array for this logical address is set to be true. Then at step 502 a new transitional physical address is determined by applying the second address translation function g(i) to the transitional logical address (TLA). Next at step 503 this new transitional physical address is subjected to the inverse of the first address translation function f(i) in order to determine a new transitional logical address. At step 504 the data value stored at the new transitional physical address retrieved from memory and at step 505 the currently held transitional value is stored at the new transitional physical address in memory. Then at step 506 the data value retrieved from the new transitional physical address in memory (at step 504) replaces the current transitional value held in the memory access circuitry. The (new) transitional logical address then at step 507 is checked to determine (from the remapped array) whether it has already been remapped. It has not then the flow proceeds to step 508 and this remapping step is then complete. However, if it has already been remapped then the flow proceeds to step 509. This remapping cycle has closed, i.e. has returned to a logical address which has already been remapped. This is indicated by setting the transitional logical address to a value of −1.

Figure 6:
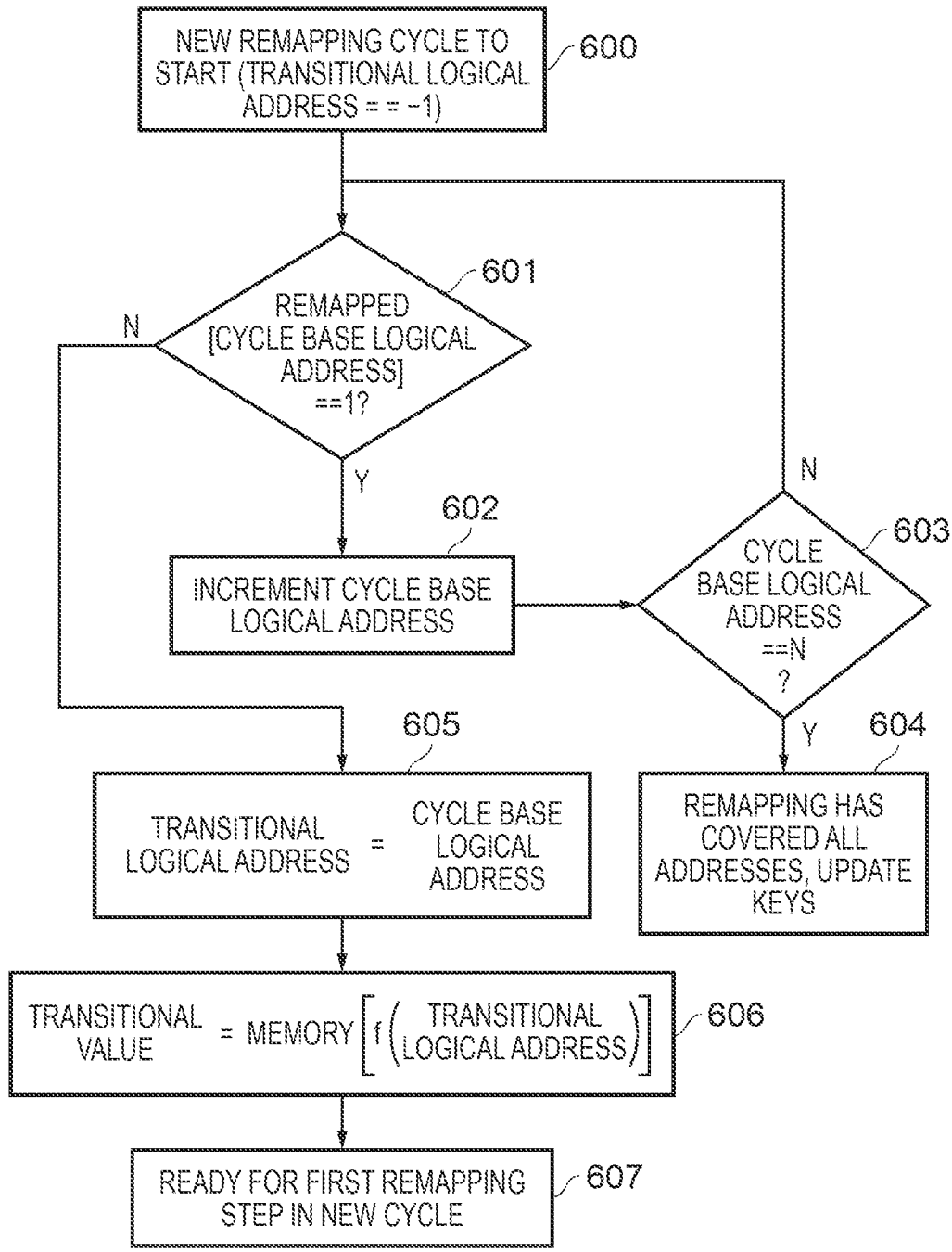
FIG. 6 is a flow diagram showing steps which are taken when initiating a new remapping cycle in accordance with some examples.

FIG. 6 is a flow diagram showing steps which are taken when a previous remapping cycle has closed. This is indicated by the transitional logical address having a value of −1 as shown in step 600. The cycle base logical address (held in the logical cycle base storage 109) is checked (with reference to the remapped array 110) to determine if this logical address has already been remapped. If it has, then the cycle base logical address is incremented at step 602 and at step 603 it is determined if the new cycle base logical address has now reached the maximum value N. N is a predefined value corresponding to the largest numbered logical address in the set of logical memory addresses for which the address translation described is performed. When this is the case, the flow proceeds to step 604. The remapping has now covered all logical addresses and the keys providing the basis for the address translation functions are updated. However, when at step 603 it is determined that N has not yet been reached the flow returns to step 601, where it is determined if this new cycle base logical address has already been remapped. When at step 601 a cycle base logical address is identified which is not yet been remapped, the flow proceeds to step 605 where the new cycle base logical address becomes the transitional logical address. The first address translation function (f(i)) is applied to this new transitional logical address to retrieve a new transitional value from memory which is stored in the transitional value storage 108 at step 606. Then memory address circuitry 102 is then configured to perform the first remapping step in a new cycle as indicated by step 607.

Figure 7:
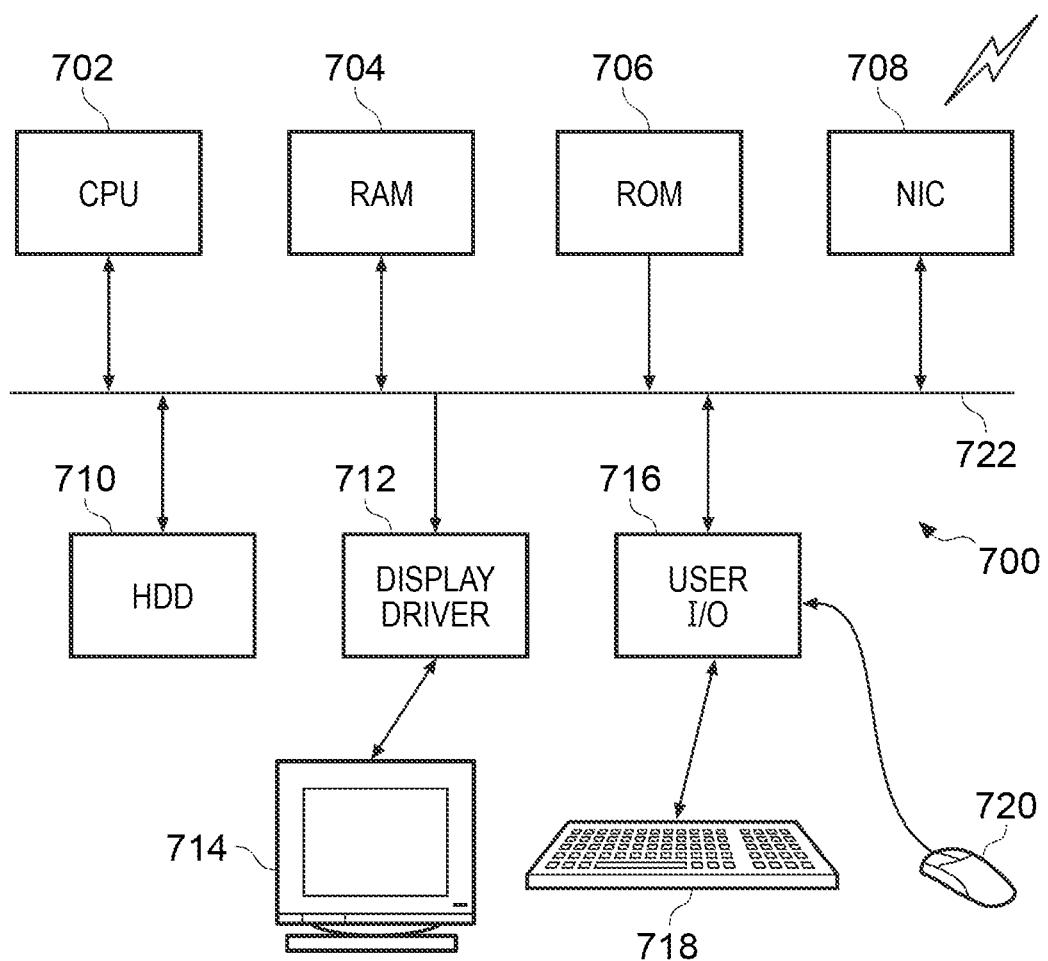
FIG. 7 schematically illustrates a general purpose computer used to implement the described techniques.

FIG. 7 schematically illustrates a general purpose computer 700 of the type that may be used to implement the above described techniques. The general purpose computer 700 includes a central processing unit 702, a random access memory 704, a read only memory 706, a network interface card 708, a hard disk drive 710, a display driver 712 and monitor 714 and a user input/output circuit 716 with a keyboard 718 and mouse 720 all connected via a common bus 722. In operation the central processing unit 702 will execute computer program instructions that may be stored in one or more of the random access memory 704, the read only memory 706 and the hard disk drive 710 or dynamically downloaded via the network interface card 708. The results of the processing performed may be displayed to a user via the display driver 712 and the monitor 714. User inputs for controlling the operation of the general purpose computer 700 may be received via the user input output circuit 716 from the keyboard 718 or the mouse 720. It will be appreciated that the computer program could be written in a variety of different computer languages. The computer program may be stored and distributed on a recording medium or dynamically downloaded to the general purpose computer 700. When operating under control of an appropriate computer program, the general purpose computer 700 can perform the above described techniques and can be considered to form an apparatus for performing the above described technique. That is to say that the methods described herein may be implemented in software executed by the CPU 702. In some examples a hardware unit may be provided (such as shown in memory access circuitry 102 of FIG. 1) within the general purpose computer 700 to perform the techniques. The architecture of the general purpose computer 700 could vary considerably and FIG. 7 is only one example.

Alternatively, the above-described techniques may be implemented in a more distributed fashion, wherein the general purpose computer 700 illustrated in FIG. 7 may be expanded and/or replaced by an infrastructure comprising components implemented on separate physical devices, the separate physical devices sharing the processing required to carry out these techniques. Such separate physical devices may be physically proximate to one another, or may even be located at entirely different physical locations. In some configurations such an infrastructure is termed a 'cloud computing' arrangement.

Various example configurations of the present techniques are set out in the following numbered clauses:

Clause 1. Apparatus for protecting a plurality of memory locations comprising:

address translation circuitry configured to translate between logical addresses and physical addresses in dependence on one of a first translation function and a second translation function;

remapping array storage configured to hold a remapping array comprising a plurality of entries corresponding to the plurality of memory locations, wherein each entry of the plurality of entries is indicative of whether a corresponding logical address is to be translated using the first translation function or the second translation function;

memory access circuitry to control access to the plurality of memory locations by causing the address translation circuitry to translate an accessed logical address into an accessed physical address using the first translation function or the second translation function in dependence on content of the remapping array for the accessed logical address;

transitional logical address storage configured to hold a transitional logical address;

transitional value storage configured to hold a transitional value associated with the transitional logical address; and remapping circuitry configured to remap the transitional logical address from first translation function usage to second translation function usage by:

determining a new transitional physical address by causing the address translation circuitry to apply the second translation function to the transitional logical address;

determining a new transitional logical address by causing the address translation circuitry to apply an inverse of the first translation function to the new transitional physical address;

retrieving a temporary transitional value from a memory location indicated by the new transitional physical address;

storing the transitional value held in the transitional value storage to the memory location indicated by the new transitional physical address; and storing the temporary transitional value to the transitional value storage.

Clause 2. The apparatus as defined in clause 1, wherein the remapping circuitry is configured to perform the remapping of the transitional logical address in an interleaved manner with respect to the access to the plurality of memory locations controlled by the memory access circuitry.

Clause 3. The apparatus as defined in clause 1 or clause 2, wherein the remapping circuitry is configured to perform the remapping of the transitional logical address in interim period when the memory access circuitry is not controlling access to the plurality of memory locations.

Clause 4. The apparatus as defined in any of clauses 1-3, wherein the remapping circuitry is configured to perform the remapping of the transitional logical address comprising causing the content of the remapping array to be modified to indicate that the transitional logical address is to be translated using the second translation function.

Clause 5. The apparatus as defined in any of clauses 1-4, wherein the remapping circuitry is configured to perform the remapping of the transitional logical address in a remapping cycle beginning at a cycle base logical address and iteratively remapping a sequence of transitional logical addresses until the new transitional logical address determined is found to be indicated by content of the remapping array to be translated using the second translation function.

Clause 6. The apparatus as defined in clause 5, wherein the remapping circuitry is responsive to conclusion of the remapping cycle to determine a new cycle base logical address which is found to be indicated by content of the remapping array to be translated using the first translation function and to start a new remapping cycle beginning at the new cycle base logical address.

Clause 7. The apparatus as defined in clause 6, wherein the remapping circuitry is responsive to a determination that all logical addresses corresponding to the plurality of memory locations are indicated by content of the remapping array to be translated using the second translation function to:
redefine the second translation function as a new first translation function;
define a new second translation function; and
reset the cycle base logical address.

Clause 8. The apparatus as defined in any of clauses 1-7, wherein the address translation circuitry is configured apply the first translation function and the second translation function by applying respective first and second private encryption keys to a predefined scrambling function.

Clause 9. The apparatus as defined in clause 8, wherein the address translation circuitry is configured periodically to update the first and second private encryption keys.

Clause 10. A method of protecting a plurality of memory locations comprising:
translating between logical addresses and physical addresses in dependence on one of a first translation function and a second translation function;
maintaining a remapping array comprising a plurality of entries corresponding to the plurality of memory locations, wherein each entry of the plurality of entries is indicative of whether a corresponding logical address is to be translated using the first translation function or the second translation function;
controlling access to the plurality of memory locations by translating an accessed logical address into an accessed physical address using the first translation function or the second translation function in dependence on content of the remapping array for the accessed logical address;
holding a transitional logical address in transitional logical address storage;
holding a transitional value associated with the transitional logical address in transitional value storage; and
remapping the transitional logical address from first translation function usage to second translation function usage by:
determining a new transitional physical address by applying the second translation function to the transitional logical address;
determining a new transitional logical address by applying an inverse of the first translation function to the new transitional physical address;
retrieving a temporary transitional value from a memory location indicated by the new transitional physical address;
storing the transitional value held in the transitional value storage to the memory location indicated by the new transitional physical address; and
storing the temporary transitional value to the transitional value storage.

Clause 11. The method as defined in clause 10, wherein the remapping of the transitional logical address is performed in an interleaved manner with respect to the controlled access to the plurality of memory locations.

Clause 12. The method as defined in clause 10 or clause 11, wherein the remapping of the transitional logical address is performed in interim period when the controlling access to the plurality of memory locations is not occurring.

Clause 13. The method as defined in any of clauses 10-12, wherein the remapping of the transitional logical address comprises causing the content of the remapping array to be modified to indicate that the transitional logical address is to be translated using the second translation function.

Clause 14. The method as defined in any of clauses 10-13, wherein the remapping of the transitional logical address is performed in a remapping cycle beginning at a cycle base logical address and iteratively remapping a sequence of transitional logical addresses until the new transitional logical address determined is found to be indicated by content of the remapping array to be translated using the second translation function.

Clause 15. The method as defined in clause 14, wherein in response to conclusion of the remapping cycle a new cycle base logical address is determined which is found to be indicated by content of the remapping array to be translated using the first translation function and a new remapping cycle is started beginning at the new cycle base logical address.

Clause 16. The method as defined in clause 15, wherein in response to a determination that all logical addresses corresponding to the plurality of memory locations are indicated by content of the remapping array to be translated using the second translation function, the method further comprises:
redefining the second translation function as a new first translation function;
defining a new second translation function; and
resetting the cycle base logical address.

Clause 17. The method as defined in any of clauses 10-16, wherein applying the first translation function and the second translation function is performed by applying respective first and second private encryption keys to a predefined scrambling function.

Clause 18. The method as defined in clause 17, wherein the first and second private encryption keys are periodically updated.

Clause 19. A computer readable-storage medium storing in a non-transient fashion instructions, which when executed by a computing device cause the computing device to perform the method of any of clauses 10-18.

Clause 20. Apparatus for protecting a plurality of memory locations comprising:
means for translating between logical addresses and physical addresses in dependence on one of a first translation function and a second translation function;
means for maintaining a remapping array comprising a plurality of entries corresponding to the plurality of memory locations, wherein each entry of the plurality of entries is indicative of whether a corresponding logical address is to be translated using the first translation function or the second translation function;

means for controlling access to the plurality of memory locations by causing the means for translating to translate an accessed logical address into an accessed physical address using the first translation function or the second translation function in dependence on content of the remapping array for the accessed logical address;

means for holding a transitional logical address;

means for holding a transitional value associated with the transitional logical address; and means for remapping the transitional logical address from first translation function usage to second translation function usage comprising:

means for determining a new transitional physical address by applying the second translation function to the transitional logical address;

means for determining a new transitional logical address by applying an inverse of the first translation function to the new transitional physical address;

means for retrieving a temporary transitional value from a memory location indicated by the new transitional physical address;

means for storing the transitional value held in the means for holding a transitional value to the memory location indicated by the new transitional physical address; and means for storing the temporary transitional value to the means for holding a transitional value.

In brief overall summary, apparatus, methods, and software for protecting a plurality of memory locations are disclosed. Logical addresses are translated into physical addresses in dependence on one of a first translation function and a second translation function. A transitional logical address and an associated transitional value are locally held in circuitry which applies the translation functions. A remapping of first to second translation function usage is performed by determining a new transitional physical address by applying the second translation function to the transitional logical address; determining a new transitional logical address by applying an inverse of the first translation function to the new transitional physical address; retrieving a new transitional value using the new transitional physical address; storing the old transitional value to the memory location indicated by the new transitional physical address; and locally storing the new transitional value. This remapping can be interleaved with normal memory accesses.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

I claim:

1. An apparatus for protecting a plurality of memory locations comprising:

address translation circuitry configured to translate between logical addresses and physical addresses in dependence on one of a first translation function and a second translation function;

remapping array storage configured to hold a remapping array comprising a plurality of entries corresponding to the plurality of memory locations, wherein each entry of the plurality of entries is indicative of whether a corresponding logical address is to be translated using the first translation function or the second translation function;

memory access circuitry to control access to the plurality of memory locations by causing the address translation circuitry to translate an accessed logical address into an accessed physical address using the first translation function or the second translation function in dependence on content of the remapping array for the accessed logical address;

transitional logical address storage configured to hold a transitional logical address;

transitional value storage configured to hold a transitional value associated with the transitional logical address; and remapping circuitry configured to remap the transitional logical address from first translation function usage to second translation function usage by:

determining a new transitional physical address by causing the address translation circuitry to apply the second translation function to the transitional logical address;

determining a new transitional logical address by causing the address translation circuitry to apply an inverse of the first translation function to the new transitional physical address;

retrieving a temporary transitional value from a memory location indicated by the new transitional physical address;

storing the transitional value held in the transitional value storage to the memory location indicated by the new transitional physical address; and storing the temporary transitional value to the transitional value storage.

2. The apparatus as claimed in claim 1, wherein the remapping circuitry is configured to perform the remapping of the transitional logical address in an interleaved manner with respect to the access to the plurality of memory locations controlled by the memory access circuitry.

3. The apparatus as claimed in claim 1, wherein the remapping circuitry is configured to perform the remapping of the transitional logical address in an interim period when the memory access circuitry is not controlling access to the plurality of memory locations.

4. The apparatus as claimed in claim 1, wherein the remapping circuitry is configured to perform the remapping of the transitional logical address comprising causing the content of the remapping array to be modified to indicate that the transitional logical address is to be translated using the second translation function.

5. The apparatus as claimed in claim 1, wherein the remapping circuitry is configured to perform the remapping of the transitional logical address in a remapping cycle beginning at a cycle base logical address and iteratively remapping a sequence of transitional logical addresses until the new transitional logical address determined is found to be indicated by content of the remapping array to be translated using the second translation function.

6. The apparatus as claimed in claim 5, wherein the remapping circuitry is responsive to conclusion of the remapping cycle to determine a new cycle base logical address which is found to be indicated by content of the remapping array to be translated using the first translation function and to start a new remapping cycle beginning at the new cycle base logical address.

7. The apparatus as claimed in claim 6, wherein the remapping circuitry is responsive to a determination that all logical addresses corresponding to the plurality of memory locations are indicated by content of the remapping array to be translated using the second translation function to:
redefine the second translation function as a new first translation function;
define a new second translation function; and
reset the cycle base logical address.

8. The apparatus as claimed in claim 1, wherein the address translation circuitry is configured apply the first translation function and the second translation function by applying respective first and second private encryption keys to a predefined scrambling function.

9. The apparatus as claimed in claim 8, wherein the address translation circuitry is configured to periodically update the first and second private encryption keys.

10. A method of protecting a plurality of memory locations comprising:
translating between logical addresses and physical addresses in dependence on one of a first translation function and a second translation function;
maintaining a remapping array comprising a plurality of entries corresponding to the plurality of memory locations, wherein each entry of the plurality of entries is indicative of whether a corresponding logical address is to be translated using the first translation function or the second translation function;
controlling access to the plurality of memory locations by translating an accessed logical address into an accessed physical address using the first translation function or the second translation function in dependence on content of the remapping array for the accessed logical address;
holding a transitional logical address in transitional logical address storage;
holding a transitional value associated with the transitional logical address in transitional value storage; and
remapping the transitional logical address from first translation function usage to second translation function usage by:
determining a new transitional physical address by applying the second translation function to the transitional logical address;
determining a new transitional logical address by applying an inverse of the first translation function to the new transitional physical address;
retrieving a temporary transitional value from a memory location indicated by the new transitional physical address;
storing the transitional value held in the transitional value storage to the memory location indicated by the new transitional physical address; and
storing the temporary transitional value to the transitional value storage.

11. The method as claimed in claim 10, wherein the remapping of the transitional logical address is performed in an interleaved manner with respect to the controlled access to the plurality of memory locations.

12. The method as claimed in claim 10, wherein the remapping of the transitional logical address is performed in an interim period when the controlling access to the plurality of memory locations is not occurring.

13. The method as claimed in claim 10, wherein the remapping of the transitional logical address comprises causing the content of the remapping array to be modified to indicate that the transitional logical address is to be translated using the second translation function.

14. The method as claimed in claim 10, wherein the remapping of the transitional logical address is performed in a remapping cycle beginning at a cycle base logical address and iteratively remapping a sequence of transitional logical addresses until the new transitional logical address determined is found to be indicated by content of the remapping array to be translated using the second translation function.

15. The method as claimed in claim 14, wherein in response to conclusion of the remapping cycle a new cycle base logical address is determined which is found to be indicated by content of the remapping array to be translated using the first translation function and a new remapping cycle is started beginning at the new cycle base logical address.

16. The method as claimed in claim 15, wherein in response to a determination that all logical addresses corresponding to the plurality of memory locations are indicated by content of the remapping array to be translated using the second translation function, the method further comprises:
redefining the second translation function as a new first translation function;
defining a new second translation function; and
resetting the cycle base logical address.

17. The method as claimed in claim 10, wherein applying the first translation function and the second translation function is performed by applying respective first and second private encryption keys to a predefined scrambling function.

18. The method as claimed in claim 17, wherein the first and second private encryption keys are periodically updated.

19. A non-transitory, computer readable-storage medium storing instructions, which when executed by a computing device cause the computing device to perform the method of claim 10.

20. An apparatus for protecting a plurality of memory locations comprising:
means for translating between logical addresses and physical addresses in dependence on one of a first translation function and a second translation function;
means for maintaining a remapping array comprising a plurality of entries corresponding to the plurality of memory locations, wherein each entry of the plurality of entries is indicative of whether a corresponding logical address is to be translated using the first translation function or the second translation function;
means for controlling access to the plurality of memory locations by causing the means for translating to translate an accessed logical address into an accessed physical address using the first translation function or the second translation function in dependence on content of the remapping array for the accessed logical address;

means for holding a transitional logical address;

means for holding a transitional value associated with the transitional logical address; and means for remapping the transitional logical address from first translation function usage to second translation function usage comprising:

means for determining a new transitional physical address by applying the second translation function to the transitional logical address;

means for determining a new transitional logical address by applying an inverse of the first translation function to the new transitional physical address;

means for retrieving a temporary transitional value from a memory location indicated by the new transitional physical address;

means for storing the transitional value held in the means for holding a transitional value to the memory location indicated by the new transitional physical address; and means for storing the temporary transitional value to the means for holding a transitional value.

\* \* \* \* \*